Feb. 13, 1968 A. B. CLAPPER ET AL 3,369,083

SCANNING TYPE MAGNETIC RECORDING HEAD

Filed Oct. 8, 1964

INVENTORS.
ROBERT WALLINGFORD &
ALLEN B. CLAPPER
BY Edward C. Threedy
THEIR ATTORNEY.

United States Patent Office 3,369,083

Patented Feb. 13, 1968

3,369,083
SCANNING TYPE MAGNETIC RECORDING HEAD

Allen B. Clapper, Chicago, Ill., and Robert Wallingford, Valparaiso, Ind., assignors to Universal Recording Corporation, Chicago, Ill., a corporation of Illinois Filed Oct. 8, 1964, Ser. No. 402,408
4 Claims. (Cl. 179—100.2)

ABSTRACT OF THE DISCLOSURE

A scanning device for a recording system wherein the magnetic recording gap of the device can be longitudinally scanned by magnetic or electrical means in such a manner that one portion of the gap shall respond to an informational magnetomotive force and that the responding portion shall move along at a rate and time duration determined by the parameters of the scanning mechanism.

A further object of our invention is to provide in a system of this character a method of combining the scanning magnetomotive force and the desired signal, either amplitude modulation, frequency modulation or phase modulation with or without any necessary compensating signals to achieve linearity.

A still further object of our invention is to provide a unique scanning device which comprises a plurality of stacked rings each of a different diameter so as to form a cone-shaped structure when stacked, with each ring providing a lamination plate which is adapted to lie in facial abutment with a juxtaposed plate. These plates each provide a scanning gap and are so arranged that each plate is perpendicular to the axis of the cone formed by the stacked rings.

Other objects will appear hereinafter.

The invention consists in the novel combination and arrangement of parts to be hereinafter described and claimed.

The invention will be best understood by reference to the accompanying drawings showing the preferred form of construction, and in which.

Figure 4:
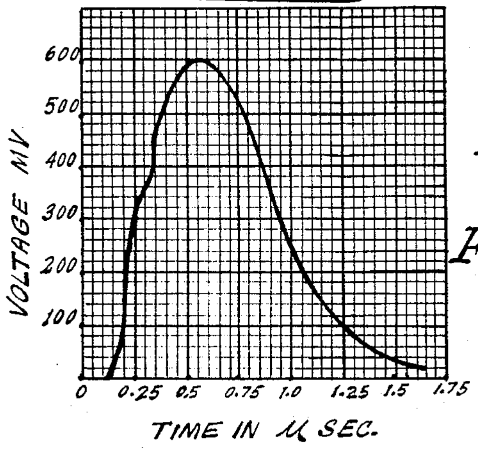
Figures 3, 5, 6:
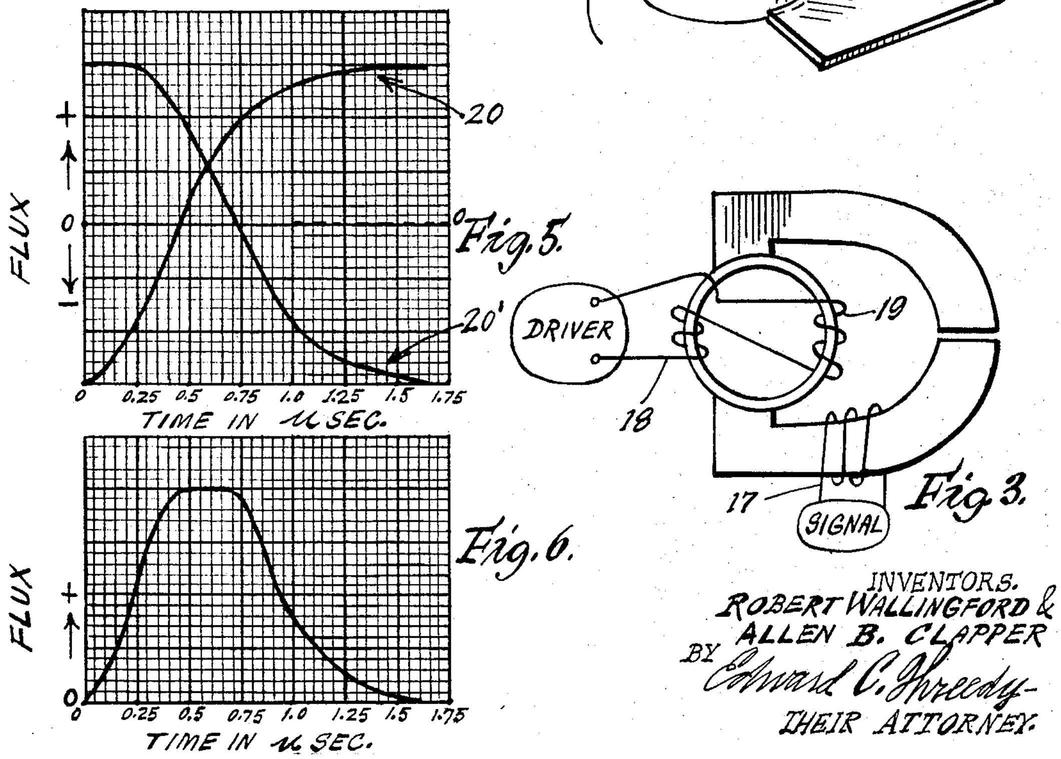
FIG. 3 is a schematic wiring view for our improved scanning head.

FIGS. 4, 5, and 6 are graphs of voltage curves and flux.

Figure 1:
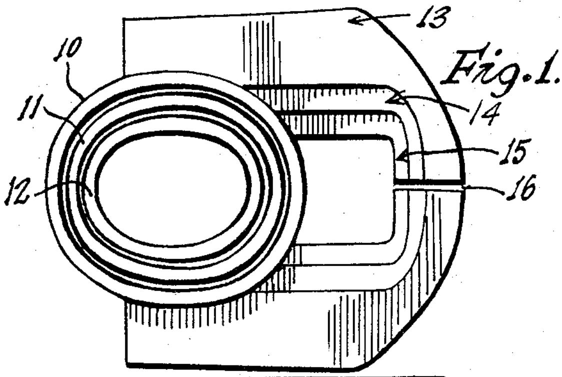
FIG. 1 is a perspective view of our improved recording head.
Figure 2:
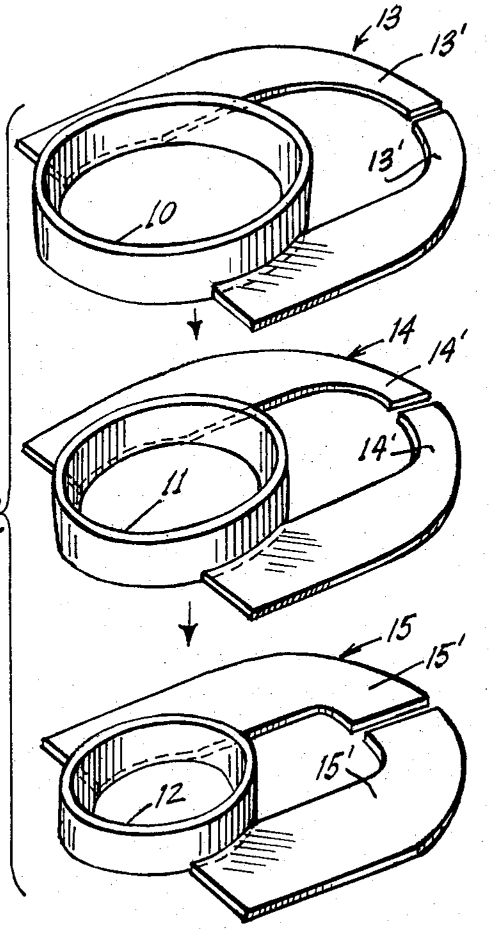
FIG. 2 is a perspective view of the scanning device with each part thereof shown in exploded relation.

Referring to FIG. 1, we show our preferred form of a scanning device as employed in our recording system wherein there is a plurality of rings 10, 11, and 12, each having a different diameter with the smaller diameter rings being inserted into and encircled by the largest diameter ring, as shown. Each of the rings 10, 11, and 12 is composed of a magnetic material possessing square hysteresis loop properties with each ring capable of being magnetically switched in a manner hereinafter explained by a driving current.

Integrally connected to each of the rings 10, 11, and 12, is a single lamination or plate 13, 14, and 15, of the recording head, each of which include semi-circular arms 13', 14' and 15' respectively which provide a scanning gap 16 diametrically positioned 180° from the rings 10, 11, and 12.

When the rings 10, 11, and 12, as well as the lamination plates 13, 14, and 15 are stacked as shown in FIG. 1, an electrical conducting coil 17 is placed about the corresponding legs 13', 14' and 15' of such plates. Through this coil, which may be either single or balanced, will flow a current which is a mathematical function of the signal to be recorded. The stacked rings 10, 11, and 12 12 in turn will have coiled thereon, in the manner shown in FIG. 3, a double winding 18 and 19 through which is adapted to flow a switching or driver current.

When the scanning device is so constructed and there is introduced into the windings 18 and 19 a current which is of a determined polarity and magnitude, the direction of flux in the ring 10 will shift from a counterclockwise direction to a clockwise direction following a flux-time relationship as shown in the graph of FIG. 5.

If at this time the signal current is zero, then the amount and the rate of change of flux in the diametrically opposed segments of the ring 10, as defined by the windings 18 and 19, is at all times identical in magnitude and in opposite directions with reference to the external magnetic circuit. This condition will prevent a flow of flux in the laminated plate 13 of ring 10 and produce no magnetomotive force at its portion of the recording gap 16.

Now assume that during the magnetic flux switching of ring 10 by the driver current in windings 18 and 19, a signal current is introduced into the winding 17 on the plate 13 and it is of such polarity and amplitude so as to create a magnetomotive force across the ring 10, then when the same current function of the driving current is present, the additional magnetomotive force will increase a flux reversal shift in that portion of the ring 10 defined by winding 18 and oppose a flux reversal shift in the diametrically opposite portion of the ring 10 as defined by winding 19.

Referring to FIG. 5, the graph shows the condition of our system in which the unmodulated switching would begin and the shifting of each curve. The curve 20 which begins at the lower left side of the graph of FIG. 5 represents the flux in the upper section of ring 10 while the other curve 20' of such graph represents the flux in the lower section of ring 10. When the effects of the combination of these two curves 20 and 20' on the external magnetic circuit created in plate 13 is plotted, a flux-time curve 21 similar to the graph illustrated in FIG. 6 is obtained. In this graph of FIG. 6, the positive direction of flux is to the right as is the signal magnetomotive force. The opposite polarity signal current will produce an opposite direction of flux regardless of the direction of flux switching and the amplitude of the pulse of flux increases as the magnitude of the signal current increases.

Upon the introduction of an opposite polarity signal current there will be produced an opposite direction of flux regardless of the direction of flux switching and, as hereinafter explained, the amplitude of the pulse of flux increases in proportion to the magnitude of the signal current.

Ring 11 and its associated laminated plate 14 will be under the influence of the same two magnetomotive forces existing in ring 10 and its plate 13 (i.e. that force produced by the signal current and by the driving current). However, due to the slightly larger flux path length in ring 11 by reason of its larger diameter, the value of the driving current will produce a lesser magnetomotive force. If the driving current is of a ramp current function, either linear or non-linear, the flux switching of ring 11 will occur subsequent to the flux switching created in ring 10. If the lamination plates 13 and 14 are arranged in sequence with progressively larger square hysteresis loop rings, then the modulated flux through any section of the gap 16 will be the resulting function of both the signal current and the driving current, and the active portion of the gap 16 between the arms of the laminated plates will proceed along the gap at a rate determined by the instantaneous rate of increase in the driving current, and will have a length and time duration determined by the instantaneous amplitude of the signal current, the rate of increase in the driving current, the switching constant of the square hysteresis ring material and the flux path length of the square hysteresis ring material.

During the time interval in which ring 12 is not in the process of switching, the external magnetic circuit and its associated laminated plate 15 will have a permeability near unity and therefore nearly all of the signal magnetomotive force will be expanded, and there will be an absence of recording magnetomotive force at the plate 15 and its recording gap 16.

In the reproducing mode the magnetomotive force created by the tape at the gap 16 influences the switching caused by the driving current in the same manner as the signal current does in the recording mode and the resulting flux variations create a voltage in the signal windings which is a functional result of the original input signal.

The rings 10, 11, and 12, as well as their associated laminated plates 13, 14, and 15 can be constructed in many forms without altering the essence of this invention. Regardless of their construction, the stacked cone structure resulting from the nesting of the rings 10, 11, and 12 with respect to each other, such cone-shaped structure will be subject to a scanning magnetomotive force created by the driving current. The rate of progression of the zone of flux switching being increased on one side of the cone and decreased on the opposite side by the external magnetomotive force created by the signal current. The signal magnetomotive force will then effect the laminated plates 13, 14, and 15 during the period of time between the beginning of the leading flux switching and the end of the lagging flux switching in such rings 10, 11, and 12.

In the preferred form of construction of our invention the rings 10, 11, and 12 are made of metallic material such as grain oriented 50–50 nickel iron, and with a cross sectional area 0.00025 inch and a positive magnetic contact with a one mil thick lamination plate of sufficiently high permeability that a minimum of about 10% of the resulting magnetomotive force will appear across the recording gap 16 and effect an increment of the cross sectional area of the recording tape. If 0.1% of the maximum theoretical flux of 46 maxwells flows through that portion of the cross sectional area of the recording tape it will represent 15 kilogauss which is many times greater than the necessary density for complete saturation.

Considering the use of a tape two inches wide, which is traveling at the speed of fifteen inches per second, our improved method will produce a scanning speed of two hundred thousand inches per second with a 10% overlap and a 30% buffer zone between the tracks. To record a 10 mc. signal would require a definition of one cycle per ten one mil laminations with one mil separation therebetween.

While we have illustrated and described the preferred form of construction for carrying out invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A device for recording information on a magnetic tape comprising a scanning head,
   (a) said head including a plurality of rings of different diameters and arranged in a stacked relationship,
   (b) each of said rings providing a laterally extending plate each having formed therein a scanning gap,
   (c) said plates lying in facial abutment with respect to each other when said rings are stacked and with their scanning gaps in alignment and extending perpendicular and parallel to the longitudinal axis of the magnetic tape,
   (d) means on said rings for creating a flux flow in a predetermined direction and of a predetermined amplitude, and
   (e) means on said plates for effecting the flux switching in each of said rings so as to create a recording magnetomotive force of predetermined amplitude and duration progressively across each of the scanning gaps provided by each of said plates.

2. A device for recording information on a magnetic tape comprising a scanning head,
   (a) said head including a plurality of rings of different diameters and arranged in a stacked relationship,
   (b) each of said rings providing a laterally extending plate each having formed therein a scanning gap,
   (c) said plates lying in facial abutment with respect to each other when said rings are stacked and with their scanning gaps in alignment and extending perpendicular and parallel to the longitudinal axis of the magnetic tape,
   (d) an electrical winding on said stacked rings for conducting a driving current of a predetermined polarity and amplitude for creating a flux flow in a predetermined direction therein, and
   (e) means on said plates for effecting the flux switching in each of said rings so as to create a recording magnetomotive force of predetermined amplitude and duration progressively across each of the scanning gaps provided by each of said plates.

3. A device for recording information on a magnetic tape comprising a scanning head,
   (a) said head including a plurality of rings of different diameters and arranged in a stacked relationship,
   (b) each of said rings providing a laterally extending plate each having formed therein a scanning gap,
   (c) said plates lying in facial abutment with respect to each other when said rings are stacked and with their scanning gaps in alignment and extending perpendicular and parallel to the longitudinal axis of the magnetic tape,
   (d) means on said rings for creating a flux flow in a predetermined direction and of a predetermined amplitude, and
   (e) an electrical winding on said plates for conducting a signal current for switching the flux flow in each of said rings so as to create a recording magnetomotive force of predetermined amplitude and duration progressively across each of the scanning gaps provided by each of said plates.

4. A device for recording information on a magnetic tape comprising a scanning head,
   (a) said head including a plurality of rings of different diameters and arranged in a stacked relationship,
   (b) each of said rings providing a laterally extending plate each having formed therein a scanning gap,
   (c) said plates lying in facial abutment with respect to each other when said rings are stacked and with their scanning gaps in alignment and extending perpendicular and parallel to the longitudinal axis of the magnetic tape, (d) an electrical winding on said stacked rings for conducting a driving current of a predetermined polarity and amplitude for creating a flux flow in a predetermined direction, (e) an electrical winding on said plates for conducting a signal current for switching the flux flow in each of said rings so as to create a recording magnetomotive force of predetermined amplitude and duration progressively across each of the scanning gaps provided by each of said plates.

References Cited

UNITED STATES PATENTS

| | | | |
|---|---|---|---|
| 3,175,049 | 3/1965 | Gabor | 179—100.2 |
| 3,164,682 | 1/1965 | Anderson | 179—100.2 |
| 3,246,384 | 5/1966 | Vice | 179—100.2 |
| 3,188,399 | 6/1965 | Eldridge | 340—174.1 |

BERNARD KONICK, *Primary Examiner.*

A. I. NEUSTADT, *Assistant Examiner.*